United States Patent
Yoshinaka

(10) Patent No.: US 7,914,055 B2
(45) Date of Patent: Mar. 29, 2011

(54) DISPLAY APPARATUS HAVING MECHANISM FOR OPENING AND CLOSING DISPLAY PANEL

(75) Inventor: Shinichi Yoshinaka, Kariya (JP)

(73) Assignee: Denso Corporation, Kariya (JP)

( * ) Notice: Subject to any disclaimer, the term of this patent is extended or adjusted under 35 U.S.C. 154(b) by 754 days.

(21) Appl. No.: 11/594,899

(22) Filed: Nov. 9, 2006

(65) Prior Publication Data

US 2007/0119790 A1    May 31, 2007

(30) Foreign Application Priority Data

Nov. 25, 2005  (JP) .................... 2005-340702
Sep. 19, 2006  (JP) .................... 2006-252925

(51) Int. Cl.
*E05C 17/02*  (2006.01)
*E05C 19/00*  (2006.01)

(52) U.S. Cl. .................... 292/306; 292/201; 292/280

(58) Field of Classification Search .................. 292/144, 292/201, 279, 280, 305, 306, 359, DIG. 9, 292/DIG. 10, DIG. 11, DIG. 17; 248/317; 16/270; 348/837; 345/156; 296/37.7

See application file for complete search history.

(56) References Cited

U.S. PATENT DOCUMENTS

| | | | | |
|---|---|---|---|---|
| 4,916,926 A | * | 4/1990 | Shieh | 70/135 |
| 5,096,271 A | * | 3/1992 | Portman | 312/7.2 |
| 5,177,730 A | * | 1/1993 | Utsugi | 720/646 |
| 6,199,810 B1 | * | 3/2001 | Wu et al. | 248/291.1 |
| 6,340,146 B1 | | 1/2002 | Tzeng | |
| 6,529,123 B1 | * | 3/2003 | Paul, Jr. | 340/425.5 |
| 6,633,286 B1 | * | 10/2003 | Do et al. | 345/205 |
| 6,647,819 B1 | * | 11/2003 | Chang | 74/421 A |
| 2007/0103855 A1 | * | 5/2007 | Hara et al. | 361/681 |

FOREIGN PATENT DOCUMENTS

| | | | |
|---|---|---|---|
| JP | 10056274 A | * | 2/1998 |
| JP | A-2004-237895 | | 8/2004 |
| JP | A-2005-014847 | | 1/2005 |
| JP | A-2005-170108 | | 6/2005 |
| JP | A-2005-271784 | | 10/2005 |

OTHER PUBLICATIONS

Office Action dated Aug. 8, 2008 in corresponding Chinese patent application No. 2006101628193 (and English translation).
Office Action dated Feb. 24, 2010 from China Patent Office in corresponding CN application No. 200610162819.3 (and English translation).

* cited by examiner

*Primary Examiner* — Carlos Lugo
*Assistant Examiner* — Alyson M Merlino
(74) *Attorney, Agent, or Firm* — Posz Law Group, PLC

(57) ABSTRACT

A display apparatus composed of a main body and a display panel hinged to the main body is conveniently mounted on a ceiling of an automobile. The display panel is opened to a desired position to display information to a rear seat passenger, while it is closed and stays at a rest position when it is not used. Before the display panel is driven to the desired position, it is unlocked by bringing a holding device to a releasing state, and it is locked at the desired position by bringing the holding device to a holding state. At the holding state, a rotatable member connected to the display panel is gripped by the holding device, and the gripping force imposed on the rotatable member is removed at the releasing state. In this manner, the display panel is surely locked at an arbitrary position and is freely driven with a small driving force.

10 Claims, 7 Drawing Sheets

(a)   53a / 73a / 71

(b)   53b / 73b / 71

(c)   53c / 73c / 71

(d)   53d / 73d

DISPLAY APPARATUS HAVING MECHANISM FOR OPENING AND CLOSING DISPLAY PANEL

CROSS-REFERENCE TO RELATED APPLICATIONS

This application is based upon and claims benefit of priority of Japanese Patent Applications No. 2005-340702 filed on Nov. 25, 2005 and No. 2006-252925 filed on Sep. 19, 2006, the contents of which are incorporated herein by reference.

BACKGROUND OF THE INVENTION

1. Field of the Invention

The present invention relates to a display apparatus having a mechanism for opening and closing a display panel.

2. Description of Related Art

A display apparatus having a main body and a display panel connected to the main body by a hinge has been known hitherto. In this display apparatus, the display panel is closed when it is not used, and it is opened to make an appropriate angle relative to the main body when the display panel is used. The angle between the display panel and the main body is adjusted to an appropriate angle to provide a best view to a user. The display panel is driven by a driving motor to open the display panel up to a desired angle. The opened display panel is held at the desired angle by a friction in a gear train disposed between the driving motor and the display panel. However, there is a problem that the display panel cannot be held exactly at the desired angle because there is a certain backlash in the gear train.

To cope with this problem, it has been proposed to give a large friction to a hinge connecting the display panel to the main body, or to give a biasing force to the display panel in one direction. The backlash in the gear train may be alleviated by a certain degree by employing these measures. However, it is necessary to use a large driving motor to overcome the large friction or the biasing force in driving the display panel. Further, JP-A-2004-237895 proposes to keep the driving motor to operate at a low torque when the display panel is opened to a desired position. In this manner, the backlash of the gear train is alleviated. However, the display panel has to abut a certain stopper against the low driving torque of the motor at the desired position. Accordingly, the opening angle of the display panel is limited to the position of the stopper, and it becomes difficult to arbitrarily set the opening angle according to a user's preference.

SUMMARY OF THE INVENTION

The present invention has been made in view of the above-mentioned problem, and an object of the present invention is to provide an improved display apparatus, in which a display panel hinged to a main body can be opened to any desired position and can be locked at that position without using a large driving motor.

The display apparatus according to the present invention includes a main body and a display panel hinged to the main body. The main body may be connected to a ceiling of an automobile, and the display panel is opened to a desired angle relative to the main body to display information to a passenger seated in a rear seat. The display panel is closed (positioned at a rest position) when it is not used, and is opened to a display position arbitrarily set by the passenger. At the rest position and the display position, the display panel is locked by bringing a holding device to a holding state. When the display panel is about to be moved from the rest position or the display position to other positions, the display panel is unlocked by bringing the holding device to a releasing state.

The locking mechanism is composed of a rotatable member rotating together with the display panel around the hinged portion, a motor, a gear train including a cam, and the holding device having a first holding member and a second holding member. A driving torque of the motor is transmitted to the holding device via the gear train to change the states of the holding device. More particularly, to bring the holding device to the holding state, the motor is driven forward to push the cam in the gear train against the first holding member. The pushing force imposed on the first holding member is transmitted to the second pushing member, and thereby the rotatable member is gripped between both holding members. On the other hand, to bring the holding device to the releasing state, the motor is driven backward to return the cam to its original position. By removing the pushing force of the cam imposed on the first holding member, the rotatable member is released from the grip of both holding members.

Preferably, a projection is formed around an outer circumference of the rotatable member, and a groove matching the projection is formed on each holding member. In this manner, a frictional force between the rotatable member and the holding members becomes large, and thereby the force gripping the rotatable member with the holding members is increased.

According to the present invention, the display panel is locked at the rest position and the desired display position while it is unlocked when it is being rotated to other positions. Therefore, the display panel is surely locked at an arbitrary position and is freely driven by a small driving torque. Other objects and features of the present invention will become more readily apparent from a better understanding of the preferred embodiment described below with reference to the following drawings.

DETAILED DESCRIPTION OF THE PREFERRED EMBODIMENT

Figure 1A:
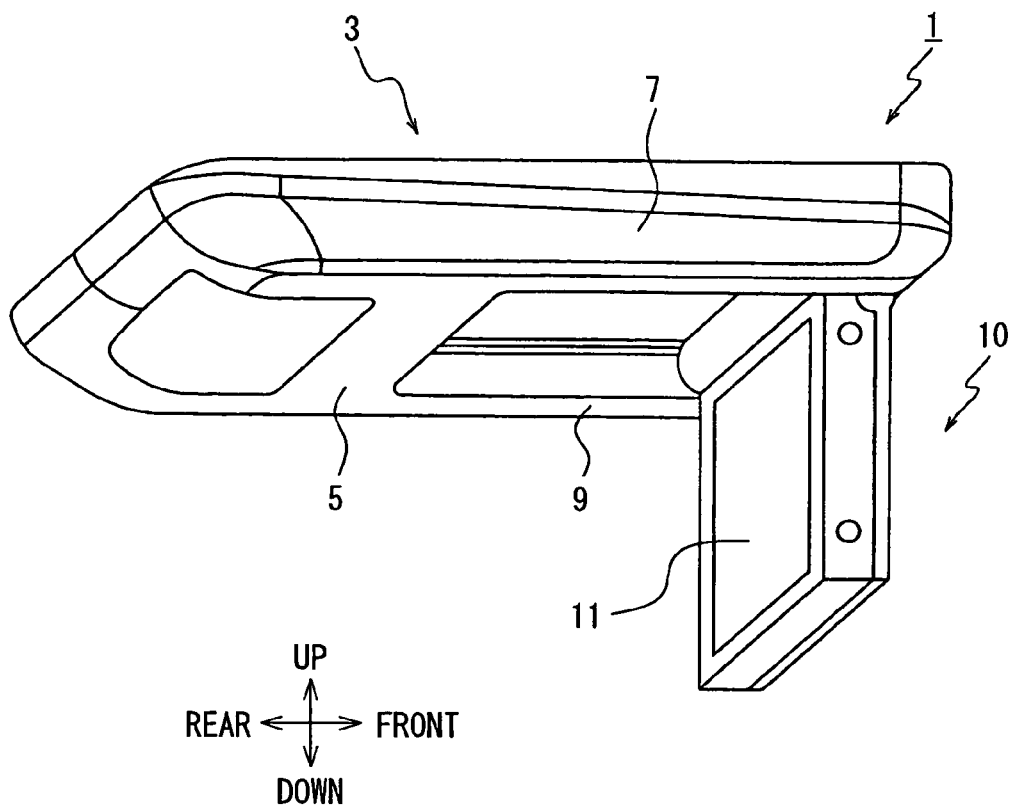
FIG. 1A is a perspective view showing a display apparatus attached to a ceiling of an automotive vehicle, a display panel being opened.
Figure 1B:
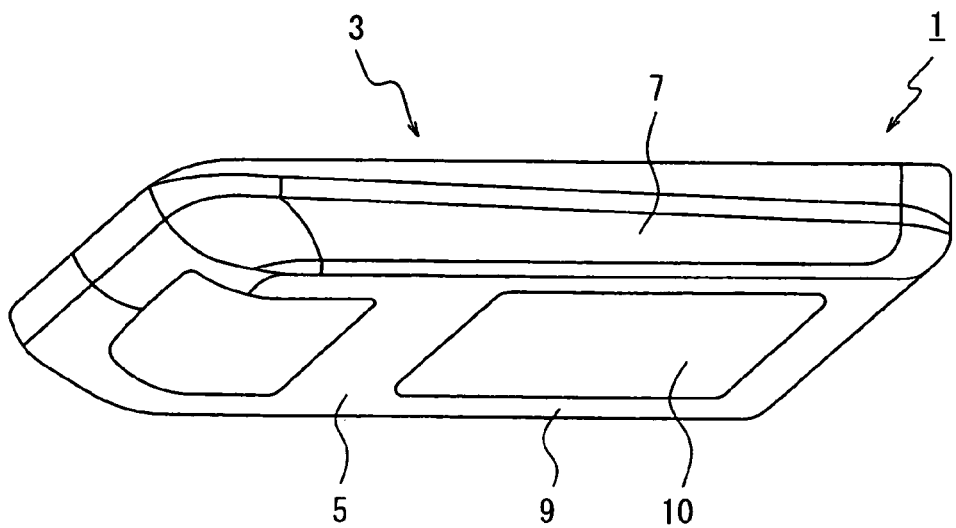
FIG. 1B is a perspective view showing the same display apparatus as shown in FIG. 1A, the display panel being closed.

A preferred embodiment of the present invention will be described with reference to FIGS. 1A-7. A display apparatus 1 is connected to a ceiling of an automobile. A display panel 10 hinged to a main body 3 is opened to show a display to a rear seat passenger, as shown in FIG. 1A. The display panel 10 is closed not to interfere with a sight of the rear seat passenger when it is not used, as shown in FIG. 1B. The display panel 10 has a display surface 11, constituted by a liquid crystal panel, for example, on which information is displayed. The main body 3 includes side spaces 7, 9 and a lower portion 5. An opening and closing mechanism 30 and a locking mechanism 40 (explained later in detail) are contained in the side spaces 7, 9.

Figure 2:
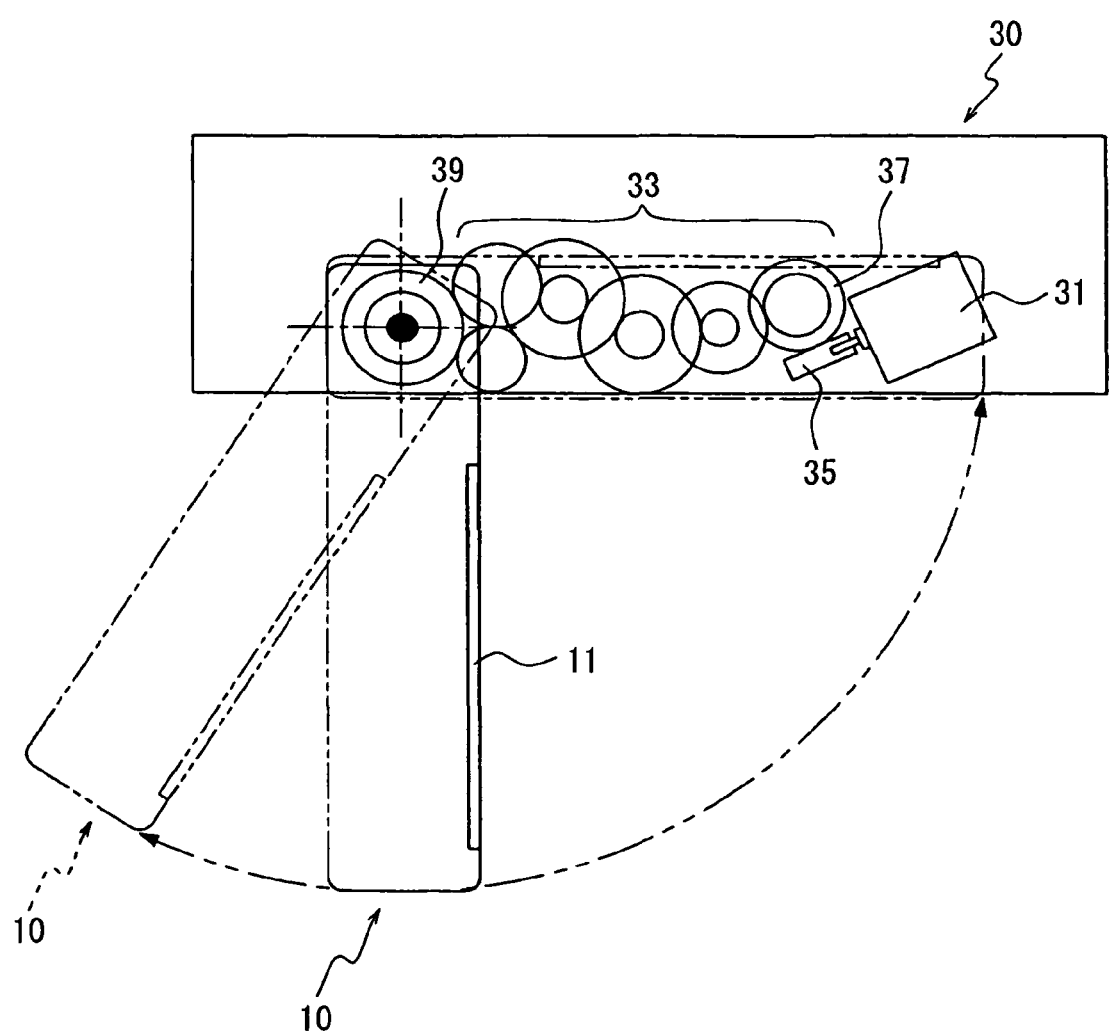
FIG. 2 is a schematic side view showing a mechanism for opening and closing the display panel used in the display apparatus.

With reference to FIG. 2, the mechanism 30 for opening and closing the display panel 10 will be described. The mechanism 30 composed of a driving motor 31, a gear train 33 and a final gear 39 connected to the display panel 10 is contained in the side space 7 (a right side space viewed from the rear seat). A worm gear 35 of the driving motor 31 engages with an intermediate gear 37 in the gear train 33, and the final gear 39 is connected to the display panel 10. When the driving motor 31 rotates, a driving torque of the driving motor 31 is transmitted to the display panel 10 via the gear train 33.

In the intermediate gear 37 engaging with the worm gear 35 of the driving motor 31, a clutch for releasing an excessive load is installed. If an opening movement of the display panel 10 is hindered by something, e.g., by a passenger, or if the display panel 10 is hit by a passenger, a high load is imposed on the display panel. To protect the gear train 33 and the worm gear 37 from such high loads, the clutch is provided in the intermediate gear 37.

A position detector 21 (FIG. 6) for detecting a position (an open angle) of the display panel 10 is installed in the vicinity of the final gear 39. The position detector 21 may be constituted by a potentiometer that outputs a signal according to the open angle of the display panel 10. When the driving motor 31 is driven forward, the display panel 10 is opened from its rest position to a display position. When the driving motor 31 is driven backward, the display panel 10 moves from the display position to the rest position (a closed position).

With reference to FIGS. 3A-5B, the mechanism 40 for locking the display panel 10 will be described. The locking mechanism 40 includes a cylindrical rotatable member 51 that rotates together with the display panel 10, a fist holding member 61, a second holding member 71, a motor 41, a cam 47 and a gear train 43. The right side ends (in FIG. 3B) of the first and the second holding members 61, 71 are connected to each other by a leaf spring 81. The leaf spring 81 made of a resilient material such as SUS 304 is fixed to the ends of the holding members 61, 71 with fixing members 83 such as screws.

The leaf spring 81 gives a biasing force to the holding members 61, 71 in a direction to separate them from each other. When a force is applied to the holding members 61, 71 in a direction to push them closer to each other against the biasing force, the rotatable member 51 is sandwiched between the holding members 61, 71. Thereby, rotation of the rotatable member 51 is restrained, and a position (an open angle) of the display panel 10 is locked. When the force for bringing the holding members 61, 62 closer to each other is removed, the holding members 61, 71 separate from each other by the biasing force of the leaf spring 81, and thereby the rotatable member 51 gripped by the holding members 61, 71 is released to be freely rotatable.

The cylindrical rotatable member 51 made of a sintered iron alloy is positioned coaxially with a rotating center of the display panel 10, and is connected to at a hinge portion of the display panel 10. The holding members 61, 71 are also made of a sintered iron alloy. The first holding member 61 is connected to the leaf spring 81 at its first end 67, and a second end 69 of the first holding member 61 is positioned to always contact a cam 47 which is rotatably supported by an eccentric rotation axis 49. The second holding member 71 is connected to the leaf spring 81 at its first end 77, and a second end of the second holding member 71 is rotatably supported by a supporting member 79 such as a pin. The first holding member 61 and the second holding member 71 contact an outer circumference of the rotatable member 51 at their contacting portions 65 and 75, respectively, when the first holding member 61 is pushed by the cam 47 toward the second holding member 71. A rotational torque of the motor 41 is transmitted from a worm gear 45 of the motor to the cam 47 via the gear train 43 composed of plural intermediate gears. No clutch is installed in the intermediate gear in the gear train 43.

Figure 4:
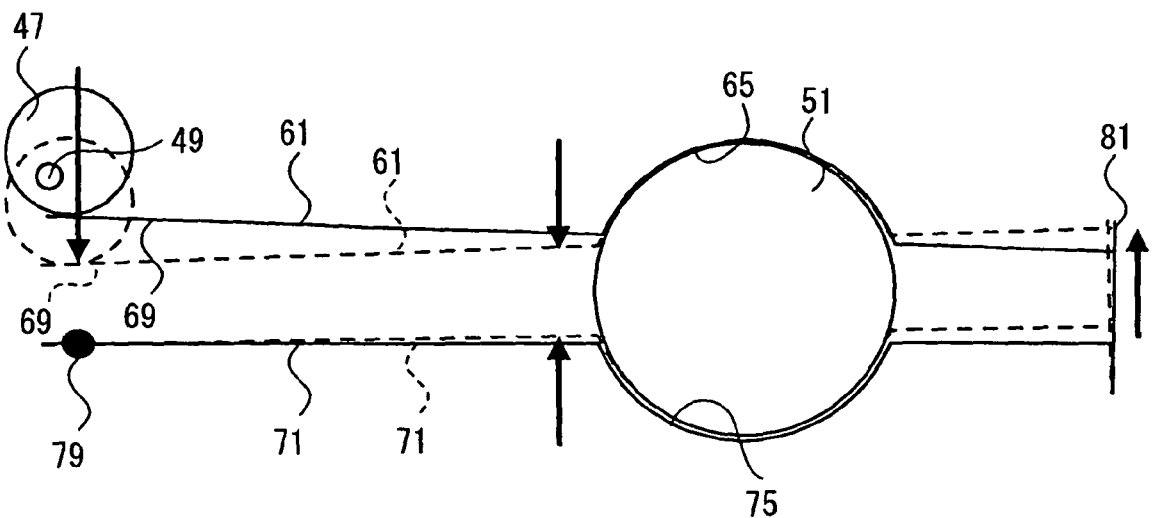
FIG. 4 is a schematic view explaining an operating mechanism of the locking mechanism.

With reference to FIG. 4, how the rotatable member 51 is held by the holding members 61, 71 will be explained. In FIG. 4, a releasing state of the holding members 61, 71 is shown with a solid line while a holding state is shown with a dotted line. The holding members 61, 71 are at the releasing state when the motor 41 is not driven. When the cam 47 is driven by the motor 41 to a position shown by a dotted line, the first holding member 61 is pushed down toward the second holding member 71 up to the position shown by a dotted line, and the contacting portion 65 of the first holding member 61 contacts the rotatable member 51. The leaf spring side of the first holding member 61 is raised to a dotted line position together with the leaf spring 81 because the contacting portion 65 functions as a fulcrum. The second holding member 71 is raised up together with the leaf spring 81 and its contacting portion 75 contacts the rotatable member 51. Thus, the rotatable member 51 is held by the holding members 61, 71, sandwiched between them.

When the motor 41 is driven backward, the cam 47 returns to the solid line position, and both of the first and the second holding members 61, 71 return to the solid line position. The force gripping the rotatable member 51 by the holding members is released by the biasing force of the leaf spring 81.

Figure 5A:
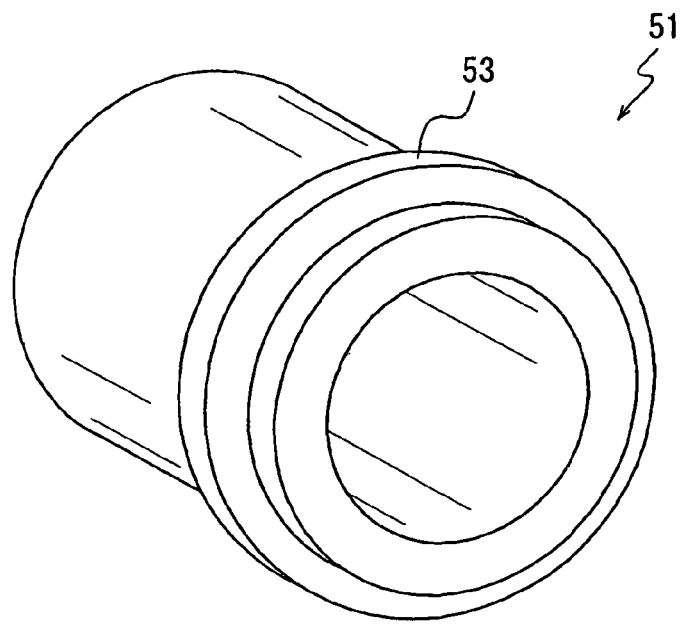
FIG. 5A is a perspective view showing a rotatable member connected to the display panel.
Figure 5B:
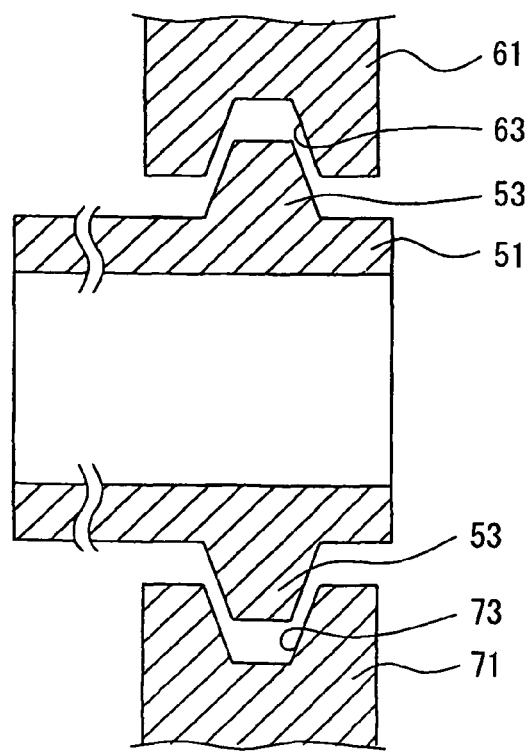
FIG. 5B is a cross-sectional view showing the rotatable member and a holing device to be coupled to the rotatable member, taken along line VB-VB shown in FIG. 3B.

As shown in FIGS. 5A and 5B, the rotatable member 51 has a circular projection 53 formed around its outer periphery. A cross-section of the projection 53 has a trapezoidal shape, as shown in FIG. 5B. On the other hand, the first holding member 61 has a groove 63. The shape of the groove 63 substantially corresponds to the trapezoidal shape of the projection 53. The second holding member 71 has the same groove 73 as the groove 63 of the first holding member 61. Grooves 63, 73 are formed along the circular outer periphery of the projection 53, and their depth is the same or smaller than the height of the projection 53. When projection 53 is coupled to the grooves 63, 73, the projection 53 functions like a wedge. Namely, slopes of the projection 53 abutting the slopes of grooves 63, 73 function to enlarge the grooves 63, 73. Therefore, a large frictional force is generated between the slopes of the projection 53 and the grooves 63, 73.

Figure 6:
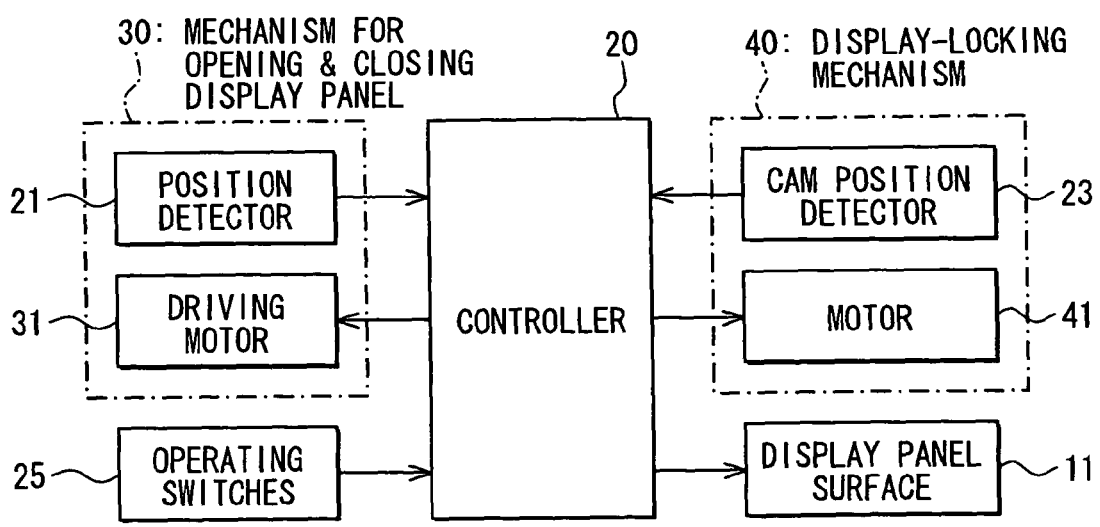
FIG. 6 is a block diagram showing electrical connections in the display apparatus.

With reference to FIG. 6, a control system of the opening and closing mechanism 30 and the locking mechanism 40 will be described. The control system includes a controller 20 constituted by a known microcomputer having CPU, ROM and RAM. The display panel surface 11 such as a liquid crystal display panel and operating switches 25 for inputting commands to the controller 20 are connected to the controller 20. The mechanism 30 for opening and closing the display panel and the mechanism 40 for locking the display panel are connected to the controller. Signals of the position sensor 21 are fed to the controller 20, and the driving motor 31 is controlled by the controller. Signals of the cam position sensor 23 are fed to the controller 20, and the motor 41 is controlled by the controller 20. The cam position sensor 23 may be constituted by a limit switch or a potentiometer, and it detects whether the cam 47 is at the releasing state or the holding state.

Figure 7:
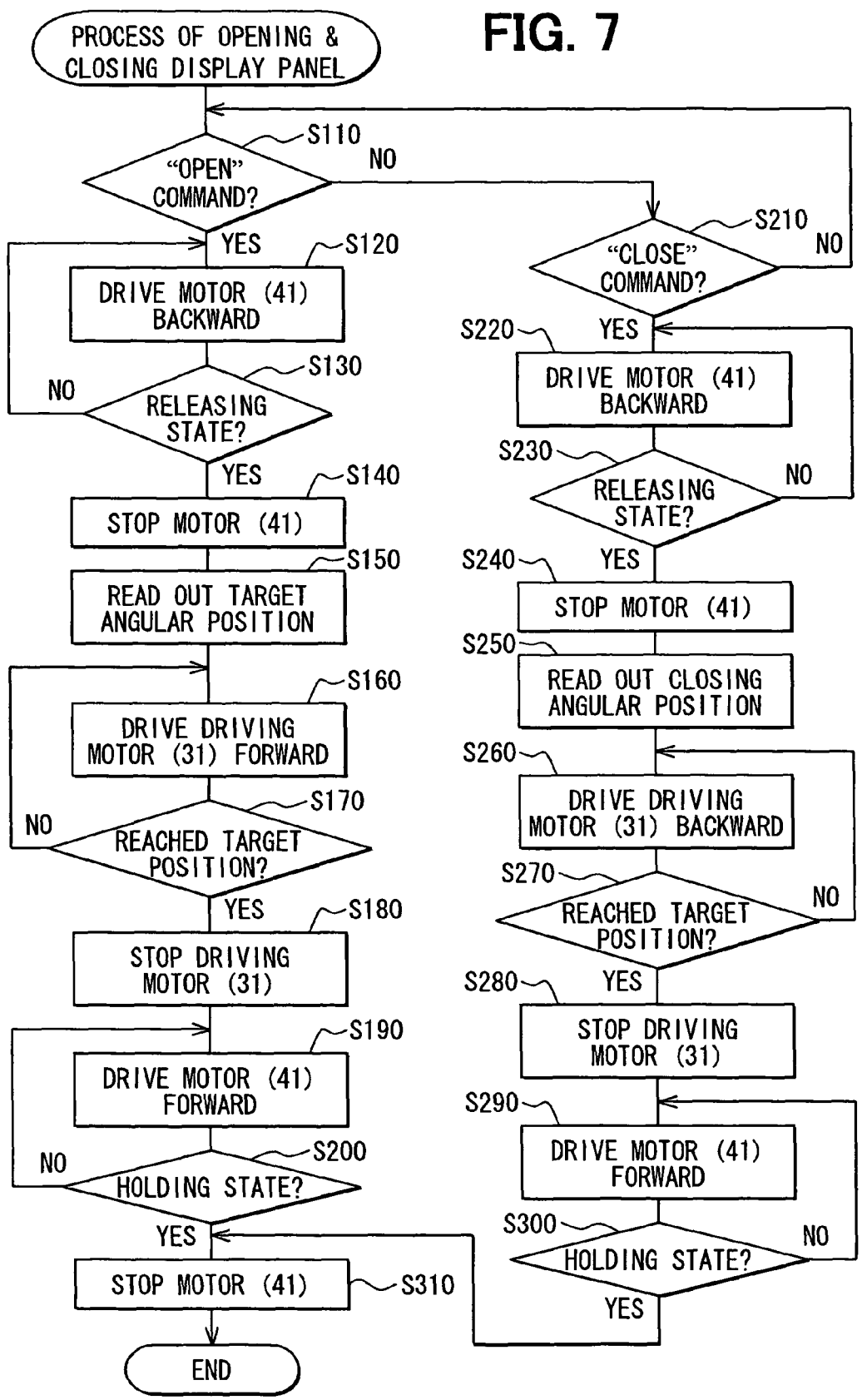
FIG. 7 is a flowchart showing a process of opening and closing the display panel.

With reference to FIG. 7, process of opening and closing the display panel (including a locking and releasing process), which is performed by the controller 20, will be described. The process shown in FIG. 7 is repeatedly carried out upon turning on the display apparatus. At step S110, whether a command to open the display panel 10 is inputted or not is checked. If the command to open the display panel is inputted, the process proceeds to the next step S210 to perform a series of steps for opening the display panel. If the command to open the display panel is not inputted, the process proceeds to step S120 to perform a series of steps for closing the display panel.

At step S120, the holding device (including the first holding member 61 and the second holding member 71) which has been at the holding state is brought to the releasing state by driving the motor 41 backward. At step S130, whether a cam position detector 23 outputs a signal indicating the releasing state is determined. If such signal is not outputted from the cam position detector, steps S120 and S130 are repeated until such signal is outputted. If it is determined that the signal indicating the releasing state is outputted from the cam position detector, the process proceeds to step S150, where a target angle for opening the display panel stored in the RAM or ROM in the controller 20 (a target angle set by a user or previously used by a user) is read out and stored in the RAM.

Then, at step S160, the driving motor 31 is driven forward to open the display panel 10. At step S170, whether the display panel is opened to the target position or not is determined. If the display panel is not opened to the target position, steps S160 and S170 are repeated until the display panel 10 reaches the target position. When the display panel 10 is opened up to the target position, the process proceeds to step S180, where the driving motor 31 is stopped. Then, at step S190, the motor 41 in the locking mechanism is driven forward to bring the holding device to the holding state. At step S200, whether a signal indicating the holding state is received from the cam position detector 23 is determined. If the signal indicating the holding state is not received, steps S190 and S200 are repeated until the signal is received. If the signal is received, the process proceeds to step S310, where the motor 41 is stopped, and comes to the end.

On the other hand, if it is determined at step S110 that the command to open the display panel 10 is not received, the process proceeds to step S210, where whether a command to close the display panel is received or not is determined. If the command to close the display panel is not received, the process returns to step S110. If the command to close the display panel is received, a series of steps S220-S300 to close the display panel up to its rest position is carried out. The series of steps S220-S300 to close the display panel is similar to the series of steps S120-S200 to open the display panel, except that the steps S150 and S160 are changed to steps S250 and S260, respectively. Therefore, only the steps S250 and step S260 will be explained below, not repeating explanation of other steps.

After the motor 41 is stopped at step S240, the process proceeds to step S250, where an angular position corresponding to the rest position stored in the RAM or ROM is read out and memorized in the RAM. Then, at step S260 the driving motor 31 is driven backward to close the display panel up to the rest position.

Following advantages are attained in the present invention. In the mechanism 40 for locking the display panel 10, the holding device (the first and the second holding members 61, 71) is brought to the holding state when the display panel 10 is at the rest position or the display position (where information is displayed for a user). On the other hand, the holding device is brought to the releasing state when the display panel 10 is being driven by the driving motor 31. At the holding state the rotatable member 51 is gripped by the holding members 61, 71, and at the releasing state the rotatable member 51 is released from the grip of the holding members 61, 71 and becomes freely rotatable. Accordingly, the display panel 10 can be held at arbitrary positions (angle) while it is moved with a small torque by the driving motor 31. Therefore, the mechanism 30 for opening and closing the display panel can be made small in size.

Since the rotation of the rotatable member 51 is restrained by a friction with the pair of holding members 61, 71, an amount of the friction can be freely set. For example, it may be set to such an amount that the display panel 10 is firmly held against a small force such as a usual vibration of a vehicle and is slid to protect a passenger when he/she hits the display panel 10. Such an appropriate force for holding the rotatable member 51 may be 48 Nm, for example.

Since the holding device is brought to the holding state by being pushed by the cam 47, which is driven by the motor 41 through the gear train 43, at the second end 69 of the first holding member 61, a proper frictional force is given to the rotational member 51. Since the driving torque of the motor 41 is transmitted via a worm gear 45 having a high speed reduction ratio, the holding members at the holding state do not change to the releasing state when the motor 41 is not driven. Since the rotatable member 51 is sandwiched between the pair of holding members 61, 71, the frictional force is uniformly generated without pushing the rotatable member 51 in one direction.

Figure 3A:
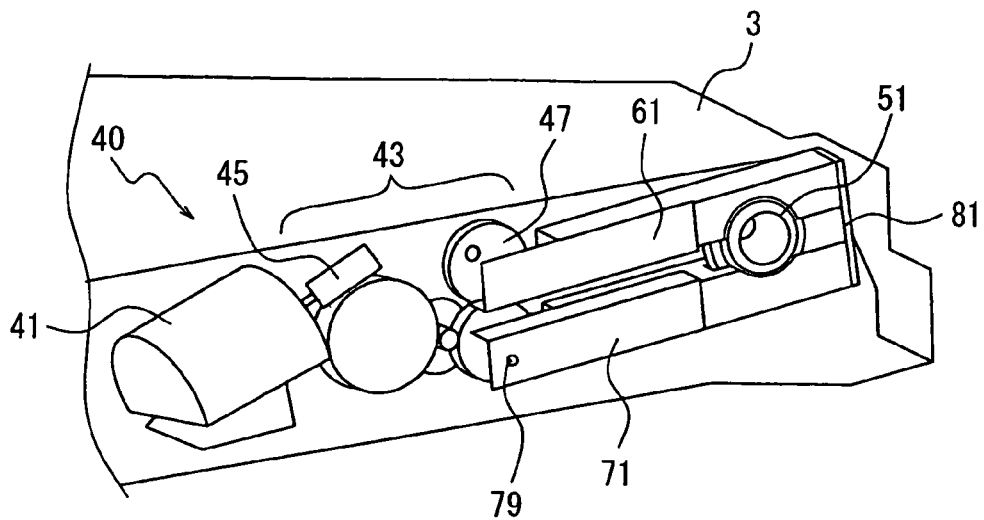
FIG. 3A is a perspective view showing a mechanism for locking the display panel used in the display apparatus.
Figure 3B:
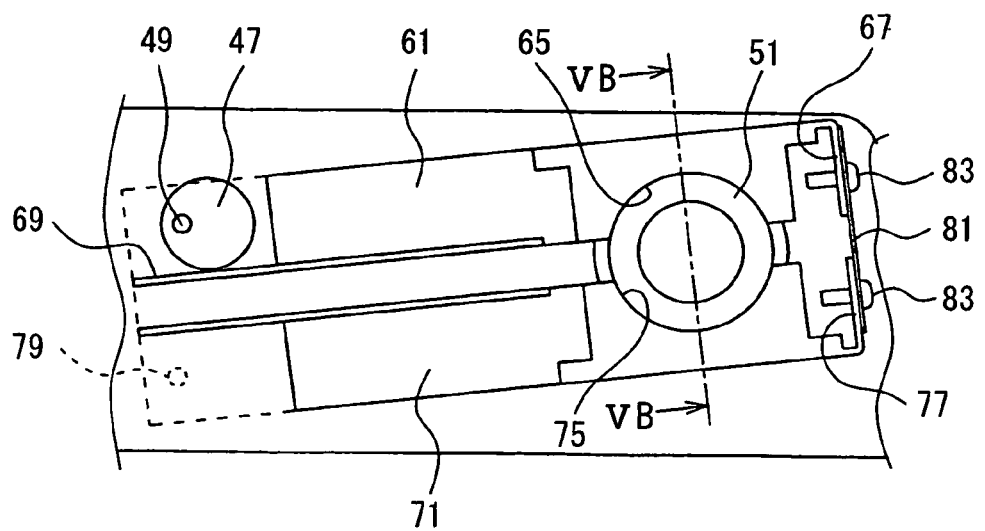
FIG. 3B is a side view showing a main portion of the locking mechanism in an enlarged scale.

The holding members 61, 71 are elongated, having a length longer than a diameter of the rotatable member 51. The first ends 67, 77 of the holding members 61, 71 are connected by the leaf spring 81 while the second end of the second holding member 71 is rotatably supported by a pin 79, as shown in FIG. 3B. Accordingly, both holding members 61, 71 move in a direction to grip the rotatable member 51 by pushing only the first holding member 61. This makes the locking mechanism simple.

The grooves 63, 73 of the holding members 61, 71 are formed to substantially match the projection 53 of the rotatable member 51. Therefore, the grooves 63, 73 correctly engage with the projection 53. Since the projection 53 is formed in trapezoidal shape, it functions like a wedge inserted into the groove 63, 73 when it engages with the groove 63, 73. Therefore, a large frictional force is generated between the projection 53 and the grooves 63, 73.

The present invention is not limited to the embodiment described above, but it may be variously modified. For example, the display apparatus 1 of the present invention may be modified to a form suitable to be mounted on a bus, an aircraft or other vehicles. Though the holding members 61, 71 are driven by the motor 41 in the foregoing embodiment, they may be manually brought to the holding or the releasing state.

Figure 8:
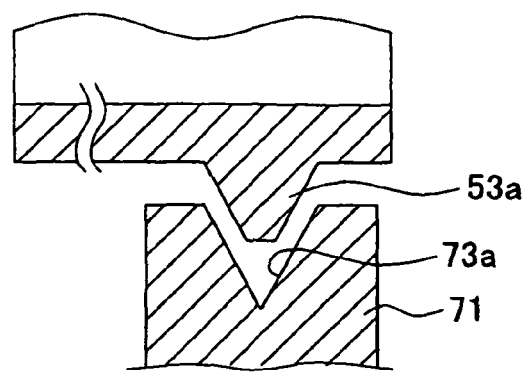
FIGS. 8(a)-8(d) are cross-sectional views showing modified forms of the rotatable member and the holding device.
Figure 8:
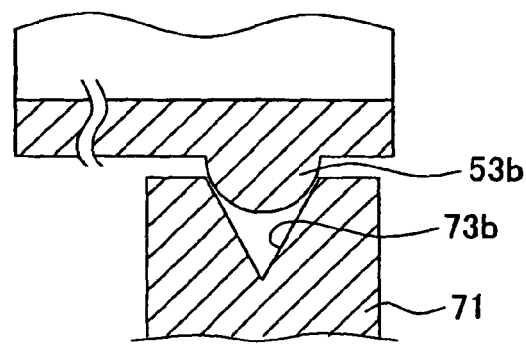
Figure 8:
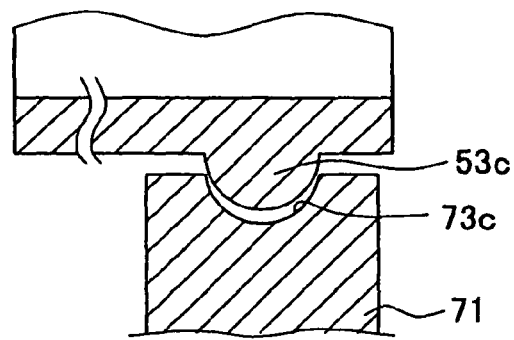
Figure 8:
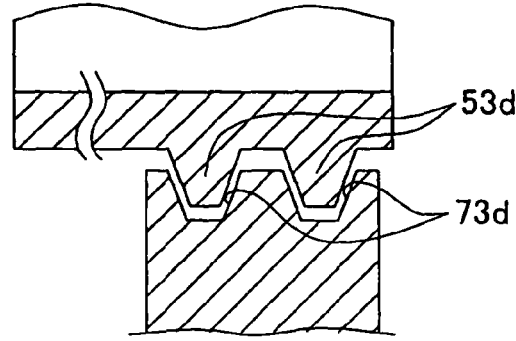

The shape of the projection 53 and the groove 63, 73 is not limited to the trapezoidal shape. It may be variously modified. For example, it may be formed in shapes as shown in FIGS. 8(a)-8(d). Though only the groove of the second holding member 71 is shown in these drawings, the other groove of the first holding member 61 is formed in the same shape. In FIG. 8(a), the projection 53a has a trapezoidal shape, the groove 73a is V-shaped, modified from the trapezoidal shape. In FIG. 8(b), the groove 73b is V-shaped and the projection 53b is formed in a half-round shape. In FIG. 8(c), both of the groove 73c and the projection 53c are formed in a half-round shape. In FIG. 8(d), two grooves 73d in a trapezoidal shape are formed on the holding member, and two matching projections 53d in a trapezoidal shape are formed on the rotatable member 51. The same wedge-effect as attained in the foregoing embodiment is attained in these modified forms, too.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A locking mechanism for locking a position of a display panel of a display apparatus, the locking mechanism comprising:
    a position detector for detecting a position of the display panel, which is hinged to a main body of the display apparatus at a pivot axis of the display panel;
    a rotatable member that is rotatable in a predetermined angular range around the pivot axis of the display panel, the rotatable member being driven together with the display panel, wherein an annular projection is formed on an outer surface of the rotatable member, wherein the annular projection is coaxial with a rotation axis of the rotatable member and is truly circular; and
    a holding device that includes at least one holding member, wherein a groove, which engages with the projection, is formed on the at least one holding member; and
    an actuator that electrically and selectively actuates the holding device to displace the at least one holding member into
    (i) a holding state where the groove of the at least one holding member engages with the annular projection of the rotatable member and the rotatable member is unrotatable and locked about the pivot axis, and
    (ii) a releasing state where the groove of the at least one holding member disengages from the annular projection of the rotatable member and the rotatable member is rotatable and unlocked to permit pivotal movement of the display panel,
    wherein the display panel has a rest position when the rotatable member is locked by the at least one holding member at one end of the predetermined angular range around the pivot axis,
    wherein the display has a display position when the rotatable member is locked by the at least one holding member in the predetermined angular range except the one end of the predetermined angular range about the pivot axis;
    wherein in the holding state, the at least one holding member is in contact with the rotatable member and the rotatable member is locked about the pivot axis by a friction force between the at least one holding member and the rotatable member; and
    wherein in the releasing state, the at least one holding member is spaced apart from the rotatable member and the rotatable member is unlocked to permit pivotal movement of the display panel.

2. The locking mechanism as in claim 1, wherein:
    the actuator includes a motor and a gear train for transmitting a driving torque of the motor to the holding device; and
    the gear train includes a worm gear connected to the motor, an intermediate gear driven by the worm gear, and a cam driven by the intermediate gear for switching the states of the holding device between the holding state and the releasing state.

3. The locking mechanism as in claim 1, wherein:
    the at least one holding member is formed as a first holding member and a second holding member, the first holding member and the second holding member being positioned to face each other with the rotatable member disposed therebetween; and
    both the first holding member and the second holding member restrain rotation of the rotatable member in the holding state and allow rotation of the rotatable member in the releasing state.

4. The locking mechanism as in claim 3, wherein:
    each of the first holding member and the second holding member is formed in an elongated shape having a length longer than a diameter of the rotatable member;
    the holding device includes a spring member that connects the first and the second holding members for biasing the first and the second holding members in a direction to separate the first holding member and the second holding member from each other, the spring member being disposed at a first end of each of the first holding member and the second holding member; and
    the actuator switches the states of the holding device from the releasing state to the holding state by pushing a second end of the first holding member toward the second holding member.

5. The locking mechanism as in claim 1, wherein:
    the holding device restricts rotation of the rotatable member by contacting the rotatable member at the holding state; and
    the groove has a shape substantially matching to a shape of the annular projection of the rotatable member at a portion where the holding device contacts the rotatable member.

6. The locking mechanism as in claim 1, wherein: a cross-section of the projection has a trapezoidal shape gradually narrowed toward its tip portion.

7. The locking mechanism as in claim 1, wherein: the groove is gradually narrowed toward its bottom portion.

8. The locking mechanism according to claim 1, wherein:
    the groove on the at least one holding member is a circular depression on the at least one holding member; and
    the annular projection and the circular depression are coaxial with the rotation axis of the rotatable member.

9. A locking mechanism for locking a position of a pivotal display panel of a display apparatus, wherein the display panel is pivoted to a main body of the display apparatus about a pivot axis, the locking mechanism comprising:
    a position detector for detecting a position of the display panel about the pivot axis;
    a rotatable member that is rotatable around the pivot axis, wherein the rotatable member is driven together with the display panel to a rest position and to a display position of the display panel, and wherein the rest position and the display position are angularly separated from one another about the pivot axis;
    a holding device that is selectively actuated to engage the rotatable member so that the rotatable member is locked about the pivot axis at the display position, and the holding device selectively disengages from the rotatable member so that the rotatable member is unlocked to permit pivotal movement of the display panel between the display position and the rest position, wherein
    an annular projection is formed on an outer surface of the rotatable member;

the annular projection is circular and coaxial with a rotation axis of the rotatable member;

a groove, which engages with the projection, is formed on the holding device; and the annular projection engages with the groove when the holding device is actuated to hold the rotatable member; and an actuator that electrically and selectively actuates the holding device into (i) a holding state in which the groove of the holding device engages with the annular projection of the rotatable member, and the rotatable member is locked with respect to the holding device and prevented from rotating about the pivot axis, and (ii) a releasing state in which the groove of the holding device disengages from the annular projection, and the rotatable member is rotatable and unlocked to permit pivotal movement of the display panel, wherein the holding device includes at least one holding member, which includes the groove, when in the holding state, a friction force between the at least one holding member and the rotatable member prevents rotation of the rotatable member.

10. The locking mechanism according to claim 9, wherein the at least one holding member comprises a pair of opposed holding members that clamp the rotatable member when the holding device is actuated.

* * * * *